United States Patent [19]

Syu

[11] Patent Number: 5,179,589
[45] Date of Patent: Jan. 12, 1993

[54] CALL PROGRESS PACING

[75] Inventor: Dzu-Wan Syu, Centreville, Va.

[73] Assignee: International Telesystems Corporation, Herndon, Va.

[21] Appl. No.: 800,546

[22] Filed: Nov. 27, 1991

[51] Int. Cl.[5] .......................... H04Q 3/64; H04M 3/42
[52] U.S. Cl. ...................... 379/265; 379/216; 379/266; 379/309
[58] Field of Search ................ 379/92, 216, 265, 266, 379/309, 201

[56] References Cited

U.S. PATENT DOCUMENTS

| | | | |
|---|---|---|---|
| 3,335,231 | 4/1964 | Gray et al. | 379/216 |
| 4,599,493 | 7/1986 | Cave | 379/247 |
| 4,829,563 | 5/1989 | Crockett et al. | 379/309 |
| 4,858,120 | 8/1989 | Samuelson | 379/113 X |
| 4,881,261 | 11/1989 | Oliphant et al. | 379/215 |
| 4,893,328 | 1/1990 | Peacock | 379/67 |
| 4,922,520 | 5/1990 | Bernard et al. | 379/88 |
| 4,933,964 | 6/1990 | Girgis | 379/216 X |

OTHER PUBLICATIONS

Martha P. Heller, "Dialing Up Debtors", Inbound/Outbound, Sep. 1989, pp. 22-26.

Primary Examiner—James L. Dwyer
Assistant Examiner—Harry S. Hong
Attorney, Agent, or Firm—Whitham & Marhoefer

[57] ABSTRACT

Briefly, this invention contemplates the provision of a call pacing method in which the number of calls to dial is periodically (e.g. every two seconds) determined on the basis of anticipated operator availability. The determined number of calls are dialed, subject to a limiting function. Calls in progress are interrupted in a short time slot just prior to first ring if the number of operators available to respond to an answered call falls below a predetermined percentage of the total number of system operators.

14 Claims, 19 Drawing Sheets

FIG. 2

24 — MEMO _____
_____

20 — NAME _____
SPOUSE NAME _____
ADDRESS _____
ADDRESS _____
CITY _____ ST __ ZIP _____
HOME PHONE ( ) - _____

26 — PMT TYPE _____
CREDIT CARD TYPE: AMERICAN EXPRESS __ VISA __ MASTERCARD __
CARD NUMBER _____
EXP DATE _____

22 — OPERATOR ID _____ DATE OF CALL _____ TIME OF DAY _____

FIG. 7 a). $C_1$

| NOPratio | $\geq NOP_{UCL}$ | $\leq NOP_{LCL}$ | OTHERWISE |
|---|---|---|---|
| VALUE OF $C_1$ | +0.25 | -0.25 | 0.00 | b). $C_2$

| $C_2$ \ NOPratio \ CONdenst | $\geq NOP_{UCL}$ | $\leq NOP_{LCL}$ | OTHERWISE |
|---|---|---|---|
| $\geq 1.0$ | 1.15 | 0.75 | 1.00 |
| $\leq 0.5$ | 1.25 | 0.85 | 1.00 |
| OTHERWISE | 1.20 | 0.80 | 1.00 | c). $C_3$

| $C_3$ \ NOPratio \ OPavail | $\geq NOP_{UCL}$ | $\leq NOP_{LCL}$ | OTHERWISE |
|---|---|---|---|
| =1 | 0.40 | 0.80 | 0.60 |
| =2 | 0.60 | 1.00 | 0.80 |
| $\leq 0.20 \ast OP_{num}$ | 0.80 | 1.00 | 1.00 |

FIG. 8 a). $C_1$

| $NOP_{ratio}$ | $\geq NOP_{UCL}$ | $\leq NOP_{LCL}$ | OTHERWISE |
|---|---|---|---|
| VALUE OF $C_1$ | 2.58 | 0.25 | 1.55 | b). $C_2 = P_1 \times P_2$

| $INT_{ratio}$ | $\geq INT_{UCL}$ | $\leq INT_{LCL}$ | OTHERWISE |
|---|---|---|---|
| VALUE OF $P_1$ | 1.50 | 0.75 | 1.00 |

| $NOP_{ratio}$ | $\geq NOP_{UCL}$ | $\leq NOP_{LCL}$ | OTHERWISE |
|---|---|---|---|
| VALUE OF $P_2$ | 1.15 | 0.85 | 1.00 | c). $C_3 = P_3 \times P_4$

| $INT_{ratio}$ | $\geq INT_{UCL}$ | $\leq INT_{LCL}$ | OTHERWISE |
|---|---|---|---|
| VALUE OF $P_3$ | 0.85 | 1.15 | 1.00 |

| $NOP_{ratio}$ | $\geq NOP_{UCL}$ | $\leq NOP_{LCL}$ | OTHERWISE |
|---|---|---|---|
| VALUE OF $P_4$ | 0.80 | 1.20 | 1.00 |

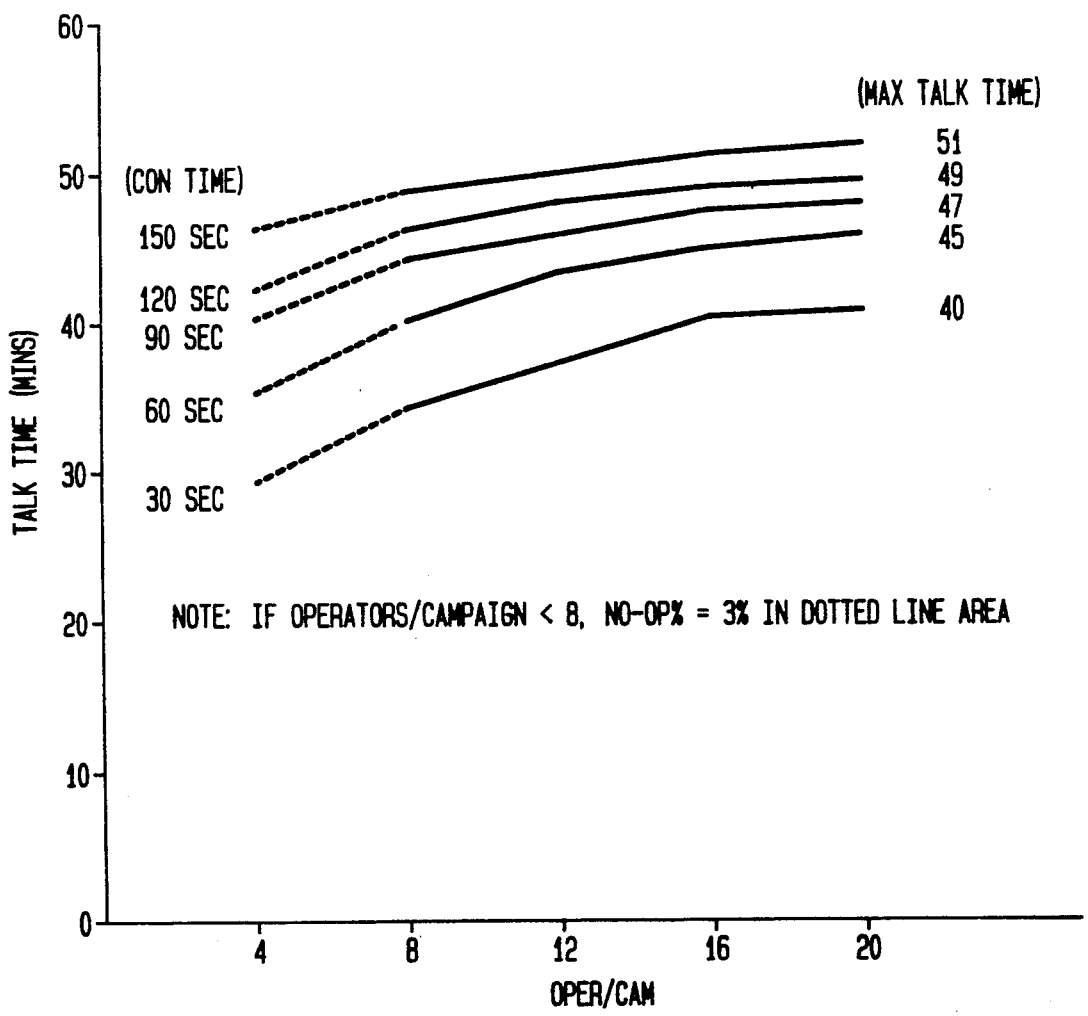

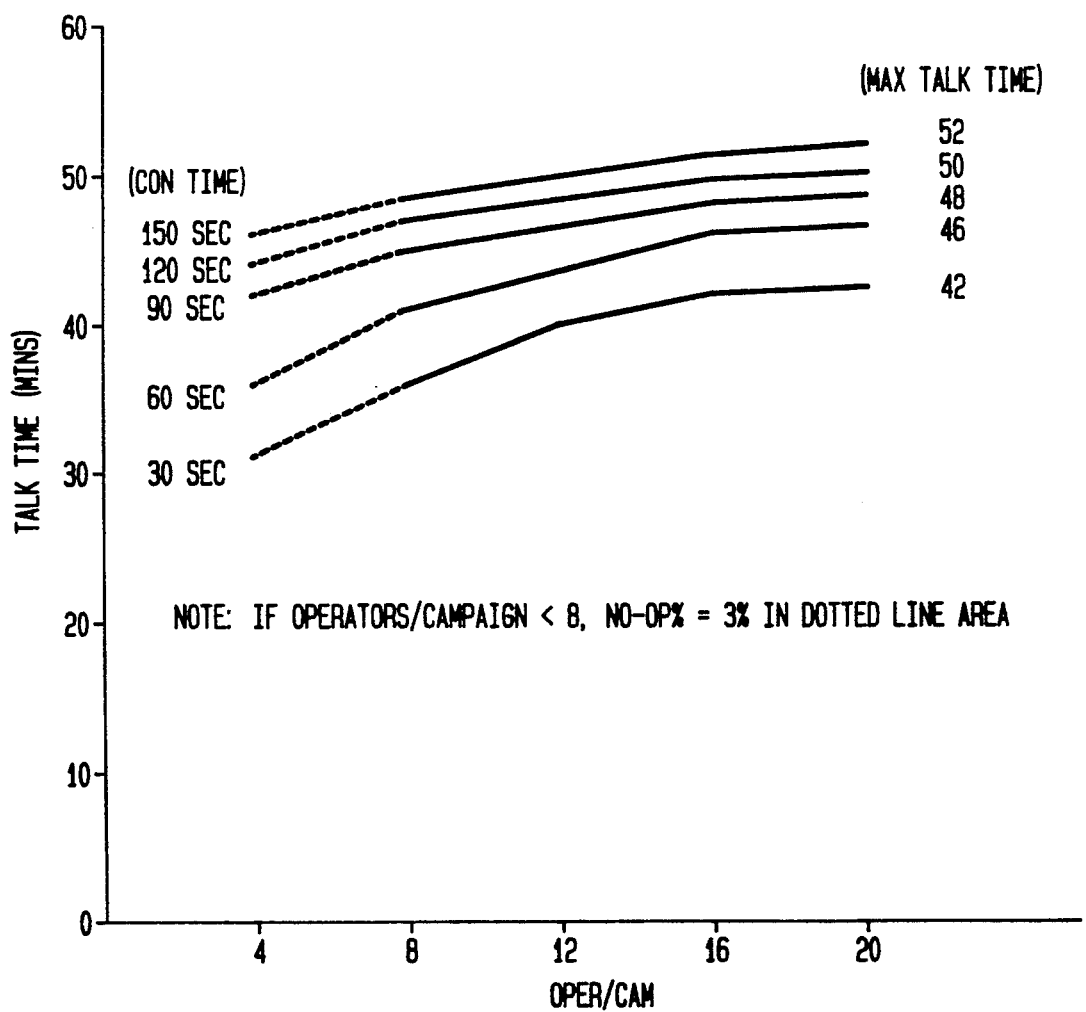

MAX NO-OP% < 5%, CAMPAIGN SIZE > 100 RECS/OPER
ANSWER % = 25%, DSETUP < 12 SECS

| CON TIME RANGE | L/O RATIO |
|---|---|
| 30 TO 60 SECONDS | 3.50/1 |
| 60 TO 90 SECONDS | 2.50/1 |
| 90 TO 120 SECONDS | 2.25/1 |
| ABOVE 120 SECONDS | 2.00/1 |

MAX NO-OP% < 5%, CAMPAIGN SIZE > 100 RECS/OPER
ANSWER % = 35%, DSETUP < 12 SECS

| CON TIME RANGE | L/O RATIO |
|---|---|
| 30 TO 60 SECONDS | 3.00/1 |
| 60 TO 90 SECONDS | 2.25/1 |
| 90 TO 120 SECONDS | 2.00/1 |
| ABOVE 120 SECONDS | 1.75/1 |

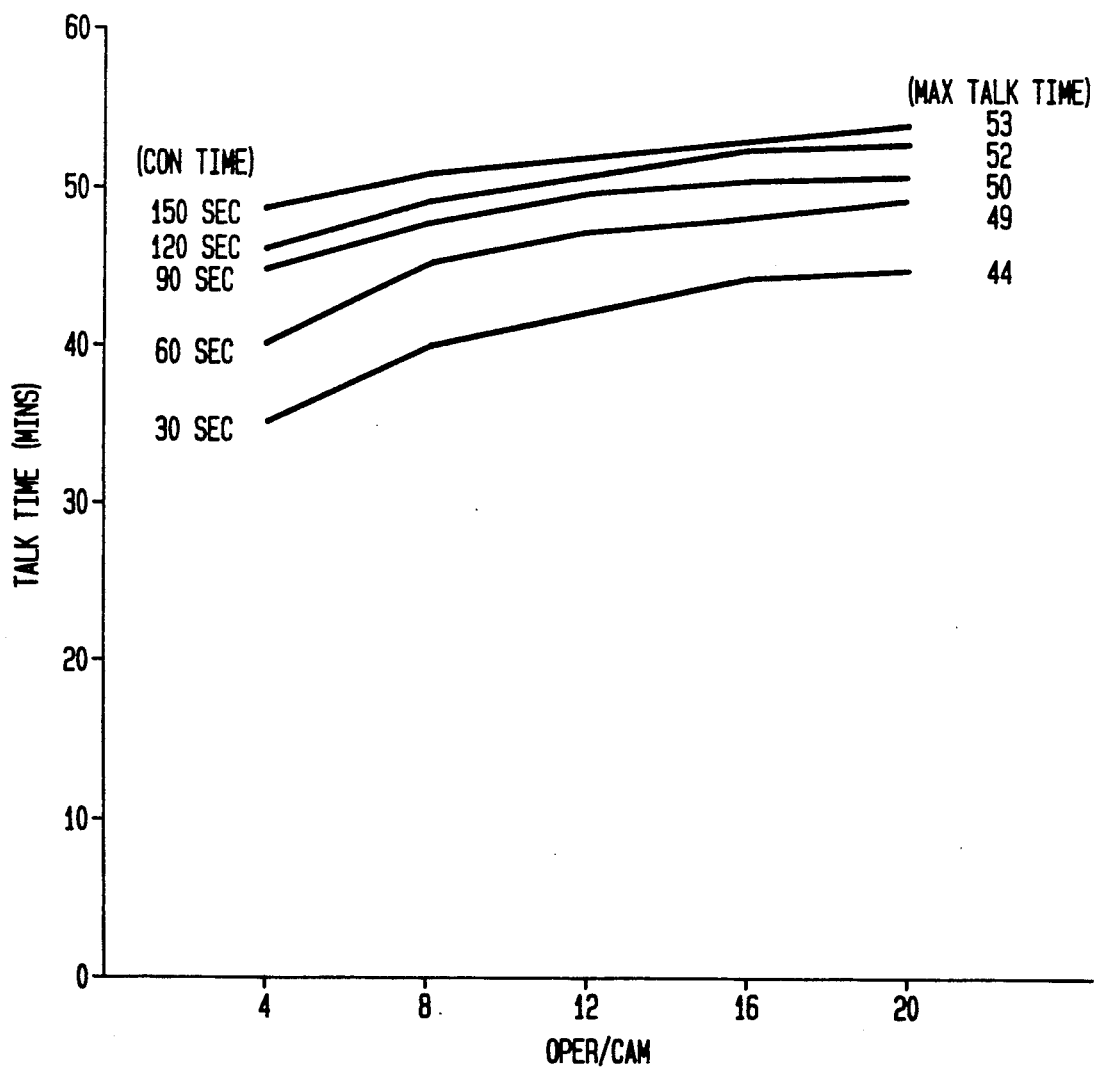

FIG. 17

A. EMULATION ENVIRONMENT VARIABLES:

a). ANSWER RATIO = 35%
  b). LINE TO OPERATOR RATIO = 1.75/ 1
  c). NUMBER OF OPERATOR WORKSTATIONS = 12
  d). NUMBER OF PHONE LINES = 20
  e). DIAL SETUP TIME =12 SECONDS
  f). NO-OP UPPER CONTROL LIMIT = 2%
  g). CONVERSATION TIME DISTRIBUTION:

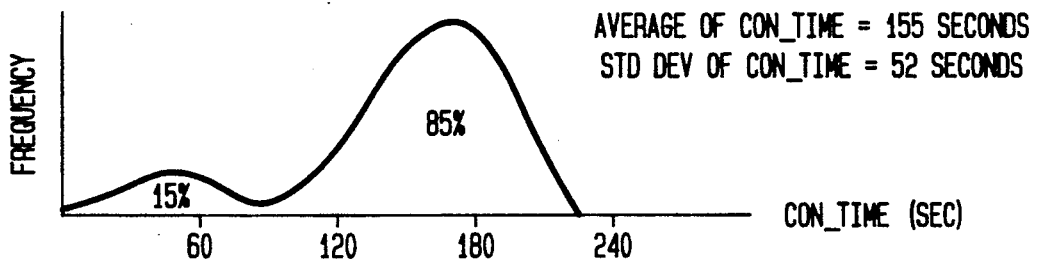

AVERAGE OF CON_TIME = 155 SECONDS
STD DEV OF CON_TIME = 52 SECONDS

B. EMULATION RESULTS:

| PACING CONTROL ALGORITHM | NO-OP% | TALK TIME (min) |
|---|---|---|
| NO DIAL AHEAD (NON-PREDICTIVE) | 0.0% | 42 |
| PREDICTIVE DIALING ALGORITHM | 1.0% | 43 |
| PREDICTIVE DIALING ALGORITHM | 7.5% | 50 |
| IMPROVED PREDICTIVE DIALING ALGORITHM | 1.6% | 50 |

FIG. 18

A. EMULATION ENVIRONMENT VARIABLES:

a). ANSWER RATIO = 35%
b). LINE TO OPERATOR RATIO = 2.25/ 1
c). NUMBER OF OPERATOR WORKSTATIONS = 12
d). NUMBER OF PHONE LINES = 27
e). DIAL SETUP TIME =12 SECONDS
f). NO-OP UPPER CONTROL LIMIT = 2%
g). CONVERSATION TIME DISTRIBUTION:

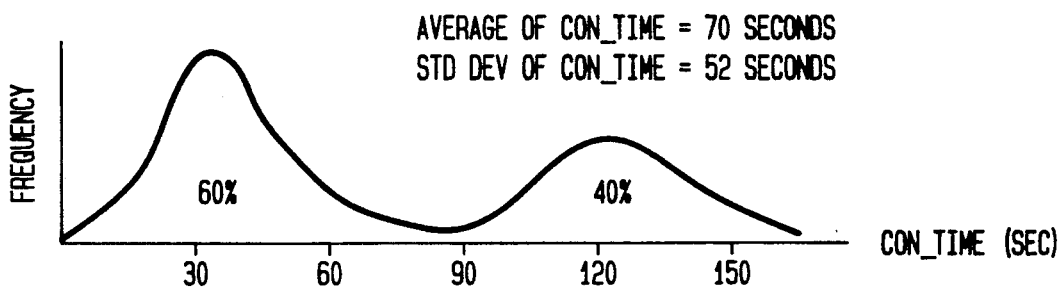

AVERAGE OF CON_TIME = 70 SECONDS
STD DEV OF CON_TIME = 52 SECONDS

B. EMULATION CAMPAIGNS AND RESULTS:

| PACING CONTROL ALGORITHM | NO-OP% | TALK TIME (min) |
|---|---|---|
| NO DIAL AHEAD (NON-PREDICTIVE) | 0.0% | 31 |
| PREDICTIVE DIALING ALGORITHM | 1.0% | 33 |
| PREDICTIVE DIALING ALGORITHM | 7.0% | 45 |
| IMPROVED PREDICTIVE DIALING ALGORITHM | 1.5% | 45 |

CALL PROGRESS PACING

BACKGROUND OF THE INVENTION

1. Field of the Invention

This invention relates to an improved pacing method for call origination management systems, and more particularly to a call interrupt method to minimize the number of client-answered calls for which there is no operator available (so-called nuisance calls).

2. Description of the Prior Art

Call origination management systems automatically dial clients, listen for the call result (i.e., ringing, busy signal, answer, no answer, etc.), and when a call results in an answer, automatically transfer the call to an available operator. Such systems are in general use today by a variety of businesses, groups and organizations.

FIG. 1 shows a system overview of a typical prior art system. The heart of the system is a main system unit 10, which typically includes central processing unit (CPU), telephone line control unit (LCU), hard disk storage 11, and a tape drive 12. A plurality of outbound telephone lines 13 are connected to the system unit 10. The number N of these outbound telephone lines typically is on the order of 48, but may be more or less depending on the specific application. A plurality of voice and data terminal stations 14 are also connected to the system unit 10. The number M of these voice and data terminal stations may be, for example, 24 for the case where the number N of the telephone lines is 48. In other words, the number M of the voice and data terminals is less than the number of telephone lines. This allows the system unit 10 to dial calls while all operators are busy talking to clients.

As illustrated in FIG. 1, each of the voice and data terminal stations comprises a combination video display terminal (VDT) and keyboard 15, and a telephone headset and microphone 16. FIG. 2 illustrates a typical operator screen as displayed by the video display terminal. When a call is transferred to an operator, a portion of this screen will already have been filled in by the CPU in the main system unit 10. Specifically, section 20 of the screen providing the name, address and telephone number of the client, will have been filled in so that the operator knows immediately who has been called. During the course of the conversation, the operator may confirm the data and, if necessary, make corrections using the keyboard. Section 22 of the screen is also filled in automatically by the CPU, based on the log-in data from the operator at the beginning of the campaign and the CPU's clock and calendar. The top portion 24 of the screen is available to be filled in by the operator with any pertinent information from the contact with the client. In addition, where a bill is to be paid or a pledge made that is to be charged to a credit card, the operator would fill in portion 26 of the screen during the call.

FIG. 3 illustrates the data flow of the system. The first step in beginning a calling campaign is to obtain the calling data, typically via tapes 30, disks 31, or through a communication link to a host computer 32. The data is input at 33, and the system then organizes the data into the records for the campaign. When the campaign is started, the data is loaded into the "input call list", as indicated at 34. The system then preloads a dialing queue 35 with a certain number of records from the calling data. As the dialing process begins, the system manages the number of calls being made at any one time based on the number of operators that are available to receive calls. When a connection is established to a client, the system routes the call to an available operator and displays the client's record on the operator screen. The operator is now ready to make the presentation to the client and record information from the transaction on the display screen. Once the operator completes the call, he or she presses a designated key on the keyboard to record the status of the contact and terminate the call. The system then makes the operator station available for another call.

After the operator has pressed the designated key, the system validates the client's record in an output call list 36, and, depending on the outcome of the call, separates the record in the corresponding output file at 37. For example, if the particular person to be contacted is not at home, the operator may press a key telling the system to place the client's record into the call-back file 38. When, for example, a call results in a future follow-up call, the operator presses another key to immediately print information of the transaction on a printer, as indicated at 39. Records which require no further action (i.e., a sale is made, wrong number, etc.), are marked complete and are not put into the call-back file but instead are put in a sale file 40.

When all the numbers have been exhausted in the campaign list, the system automatically begins a statistical analysis of both operator and campaign performance, as indicated at 41. Finally, a closeout function 42 is performed during which all relevant data of the campaign is written to a tape 43 or disk 44, or transmitted to a host computer 45.

The goal of any call origination management system is to have each operator connected to each call answered. Under these conditions, there would be maximum talk time and no nuisance calls. To accomplish this, however, requires a prior knowledge of the time it takes to connect a call and exactly how long each operator talks. In practice, both of these can be highly variable, within limits. The system cannot predict exactly when or if a placed call will result in an answer and, of course, the amount of time an operator talks will depend on the responses of the client. Therefore, scheduling the next answered call to occur exactly when an operator finishes talking, is impossible. An answer may occur before or after the operator finishes the previous call, and the result is an increase in the nuisance call rate or an increase in operator idle time, or both. Intuitively, it is clear that the system variables which affect talk time are the ratio of answered calls to the number of call attempts per session ($A_{ratio}$) and the average conversation time per call session, ($CON_{time}$. The system goal is a maximum talk time per operator with a minimum of nuisance calls.

Call pacing algorithms are used in the prior art to determine when and how many calls to place in order to maximize operator talk time. U.S. Pat. No. 4,933,964 to Bassem M. Girgis and assigned to the assignee of this application, discloses an adaptive pacing algorithm based on an analysis of the duration of calls, and is incorporated herein by reference.

In the Girgis pacing algorithm, the algorithm determines the number of calls to dial as an inverse function of the mean time of all calls and the standard deviation multiplied by a first constant. This first constant is a function of the ratio of nuisance calls to the number of call attempts but is not a definite mathematical function. It is, instead, determined experimentally to be ±0.25 of the standard deviation and varies within the ±0.25 range depending on how far the ratio of nuisance calls deviates from a set level. The number of calls to dial is also an inverse function of a second constant times the ratio of the answered calls to the call attempts per session minus the maximum allowable ratio of nuisance calls to call attempts. This second constant is itself a function of the mean time ratio of answered calls to the number of call attempts during the session and the ratio of nuisance calls to the number of call attempts, but it has been determined empirically. As the session progresses, new values of the ratio of answered calls to attempts per session, the mean time and the standard deviation are computed, and these new values are used in determining the number of calls to dial.

Call pacing algorithms such as that disclosed by Girgis are generally satisfactory. However, such prior art systems result in what, in some circumstances, is an unacceptable number of nuisance calls if the system efficiency is maintained at a high level in terms of talk time.

SUMMARY OF THE INVENTION

An object of this invention is the provision of a call pacing method that can keep the percentage of nuisance calls within prescribed limits while maintaining high system efficiency.

Another object of the invention is the provision of a call pacing method that prevents clustered dialing; a condition that can cause peak CPU overloads or excessive nuisance calls, or both.

A further object of the invention is provision of an adaptive method for positioning a window in which a call being dialed can be interrupted just prior to the first ring of the phone.

Briefly, this invention contemplates the provision of a call pacing method in which the number of calls to dial is periodically (e.g. every two seconds) determined on the basis of anticipated operator availability. The determined number of calls are dialed, subject to a limiting function. Calls in progress are interrupted in a short time slot just prior to first ring if the number of operators available to respond to an answered call falls below a predetermined percentage of the total number of system operators.

The number of calls to interrupt is determined on the basis of the total number of calls in progress (i.e., all calls dialed but not yet responded to) minus the number of calls in set-up (i.e., dialed but not yet in the interrupt time slot) minus the number of calls to which operators are predicted to be able to respond. This latter number is a function of a third constant times the number of available operators, divided by the ratio of answered calls to attempts less the maximum allowable number of nuisance calls.

Any suitable algorithm may be used to determine the number of calls to periodically dial. In a preferred specific embodiment of the invention, the basic algorithm of the Girgis U.S. Pat. No. 4,933,964 is used.

In order to prevent clustered dialing that can cause a sudden increase in the number of nuisance calls or peak CPU loads, the number of lines that are dialed in a period equal to the interrupt period is limited. Preferably, although not necessarily, the interrupt time slot and the period between a determination of the number of lines to dial is equal; for example, a two-second interrupt slot and a determination every two seconds. In a preferred embodiment of the invention, the limit of the number of lines dialed is a function of the average number of answered calls per interrupt slot period divided by the ratio of answered calls to call attempts, less the maximum number of allowable nuisance calls. The average number of answered calls per interrupt slot period is determined as a function of the number of operators times the size of the slot divided by the mean time of all answered calls.

Two sets of values for the constants (first, second and third constants) have been determined for the pacing algorithm in accordance with the invention. Using the first set of values maximizes operator productivity and minimizes the nuisance call percentage. Using the second set of values also maximizes operator productivity and minimizes not only the nuisance call percentage but also the interrupt call percentage (out of attempts). The first constant in either set is a function of the mean time of all calls, the ratio of the answered calls to the call attempts per session, the number of operators and the ratio of nuisance calls to call attempts. The second constant in either set is also a function of the mean time of all calls, the ratio of the answered calls to the call attempts per session, the number of operators and the ratio of nuisance calls to call attempts. The third constant in either set is a function of the number of available operators, the ratio of the answered calls to the call attempts per session and the ratio of nuisance calls to call attempts. Preferred values of the first, second and third constants have been determined empirically to provide good performance to the call origination management systems with conditional interrupts.

It will be appreciated that the time required for the public telephone network to process calls varies from time to time. For this reason, the edge of the interrupt slot that determines the latest time at which a call can be interrupted without a client ring varies. In accordance with a feature of this invention, the location of the edge is determined by sampling the time required to receive a busy signal return during the course of operation.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is an illustration of a typical screen which may be displayed on a video display terminal of the FIG. 1 system for viewing and filling in by an operator.

FIG. 7 is a table showing the first set of coefficients for the improved pacing control algorithm according to the invention.

FIG. 8 is a table showing the second set of coefficients for the improved pacing control algorithm according to the invention.

FIG. 11 is a family of graphs showing talk time as a function of the number of operator workstations per campaign for various values of connect time with best-suited line to operator workstation ratio, at an answer ratio equal to 25 percent and maximum nuisance call ratio equal to 2 percent.

FIG. 12 is a family of graphs similar to FIG. 11 showing talk time as a function of the number of operator workstations per campaign for various values of connect time with best-suited line to operator workstation ratio, at an answer ratio equal to 35 percent and maximum nuisance call ratio equal to 2 percent.

FIG. 16 is a family of graphs similar to FIG. 11 showing talk time as a function of the number of operator workstations per campaign for various values of connect time with best-suited line to operator workstation ratio, at an answer ratio equal to 45 percent and maximum nuisance call ratio equal to 5 percent.

FIG. 17 is a performance comparison table among three different pacing control algorithms with the majority of the connected calls resulting in long conversations.

FIG. 18 is a performance comparison table among three different pacing control algorithms with the majority of the connected calls resulting in short conversations.

DETAILED DESCRIPTION OF A PREFERRED EMBODIMENT OF THE INVENTION

In the description, the following terms are used. Definitions are provided next to each of the terms.

$A_{ratio}$ is the ratio of answered calls to the number of call attempts per session.

$CONN_{ratio}$ is the ratio of calls connected to an operator to the number of call attempts per session. Note that this ratio is typically different from $A_{ratio}$ since all calls which are answered may not be connected to an operator if an Operator is unavailable when the call is answered.

$CON_{time}$ is the average conversation time per call per session.

$S_{tslot}$ is the size of the interrupt time slot for call interrupt.

$CON_{denst}$ is the average number of connects per interrupt time slot.

$LO_{ratio}$ is the number of lines (trunks) divided by the number of active operator stations.

$N_1$ is the average number of lines to be dialed per unit of time.

$N_2$ is the average number of lines to keep per unit of time; $N_1$ includes only the number of lines passed the critical time slot for call interrupt to which there has been no response and a portion number of lines inside the critical time slot.

$DIAL_{max}$ is the maximum number of lines allowed, in accordance with the smoothing algorithm, to be dialed for a single time slot with a size equal to $S_{tslot}$.

$N_{inprogress}$ is the number of calls currently in progress. Note that this number is included in $N_1$ and must be taken into account when new calls are to be dialed.

$N_{insetup}$ is the number of calls in progress before the time slot for call interrupt.

$NOP_{max}$ is the maximum allowable ratio of no operator available (i.e., nuisance) calls to call attempts.

$NOP_{ratio}$ is the number of nuisance calls (no operators available) divided by the number of call attempts.

$INT_{max}$ is the maximum allowable ratio of interrupted calls to call attempts.

$INT_{ratio}$ is the number of interrupted calls divided by the number of call attempts.

$OP_{num}$ is the number of operators logged into the system.

$OP_{exp}$ is the number of operators expected to be available at a given time.

$OP_{avail}$ is the number of operators actually available in the system at a given time.

$SAFETY_{level}$ is the number of available operators in the system needed to safely avoid nuisance calls.

SESSION is the period for statistical refresh.

$T_{setup}$ is the average time to complete a call attempt.

$T_{busy}$ is the average time to get a busy call result, measured in seconds.

$T_{talk}$ is the average talk time per hour per operator, measured in minutes.

$B_{recog}$ is the average time to recognize a busy call result, measured in seconds. Note that 0.5 seconds needs to be added to $B_{recog}$, since the ring/busy tone waves on calling and called parties are not synchronized. Another 2.0 seconds also needs to be added to $B_{recog}$ to cover LCU signal handling delay and the deviation of $B_{recog}$ itself.

$D_{setup}$ is the average time to dial a call before receiving any call result tone, measured in seconds.

Figure 1:
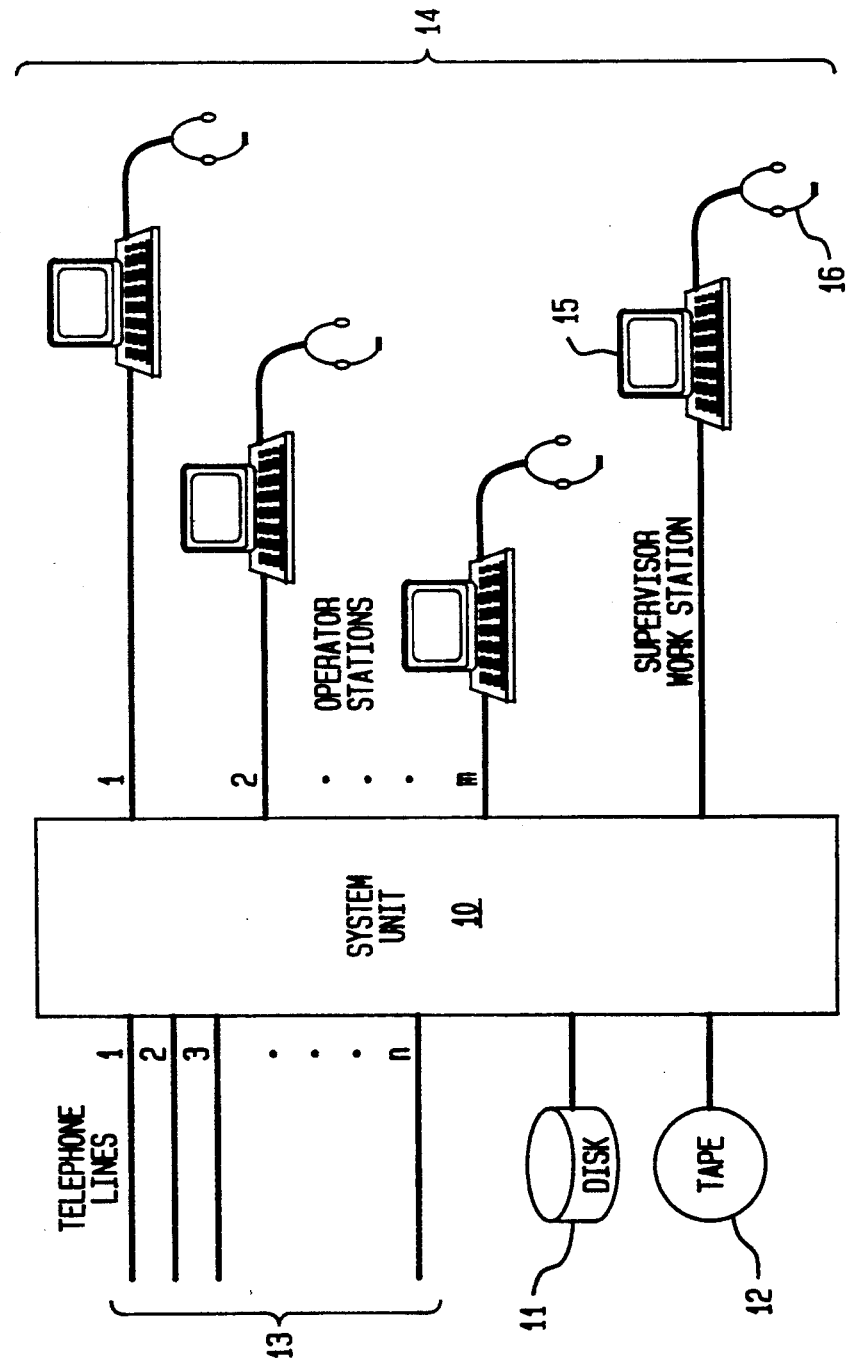
FIG. 1 is a high-level block diagram showing an overview of a typical prior art telephone call origination management system.
Figure 3:
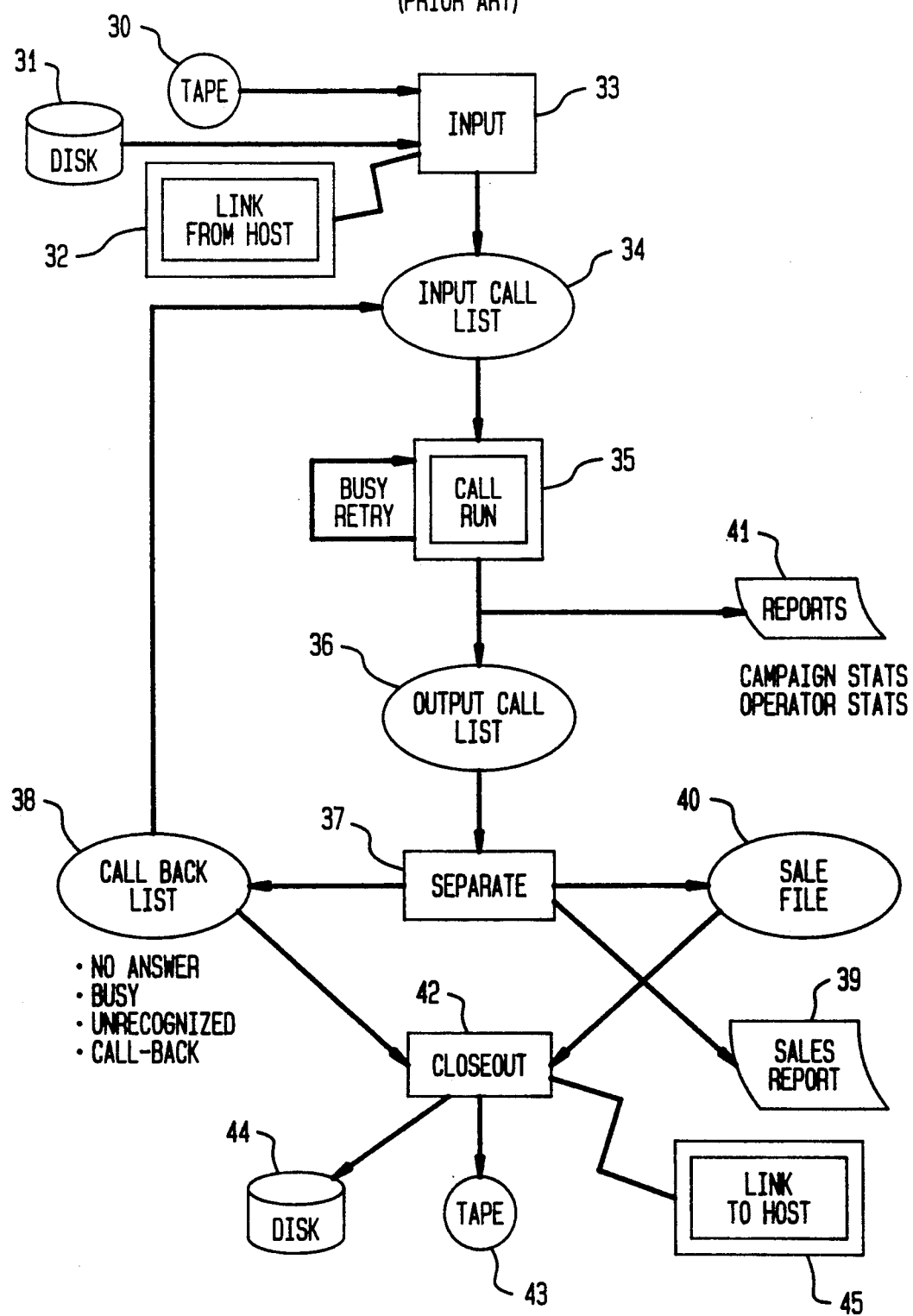
FIG. 3 is a data-flow diagram illustrating the processes performed by the telephone call origination management system of FIG. 1.

It will be appreciated the call interrupt method of this invention can be used in a typical call management system of the type in use and explained in connection with FIGS. 1-3, and particularly in a nonqueuing type of call management system as described, for example, in the Girgis U.S. Pat. No. 4,933,964.

Figure 4:
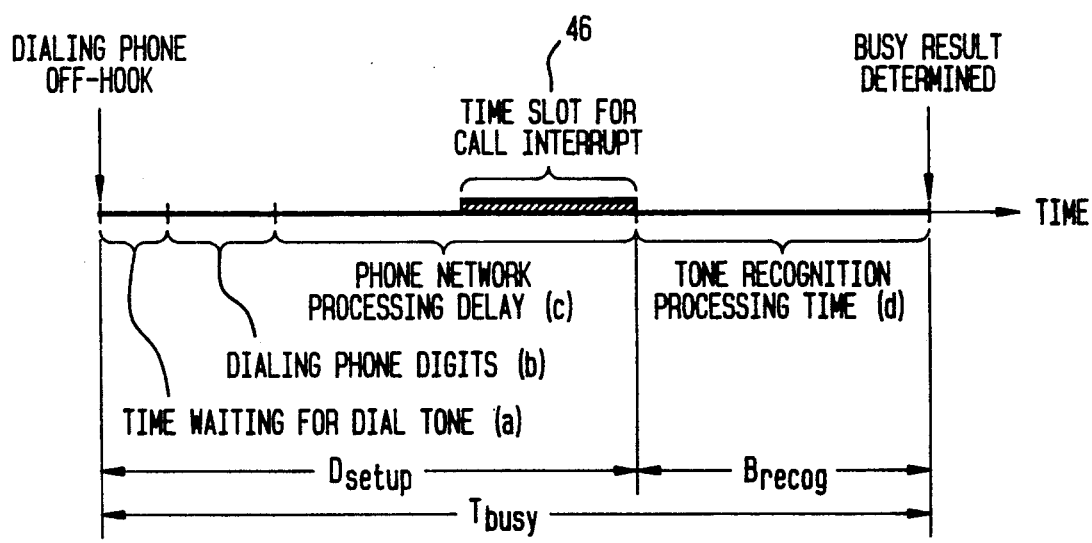
FIG. 4 is a graph showing how a phone call is processed and the order of time intervals for waiting for dial tone, digits dialing, phone network processing delay and tone recognition.

Referring now to FIG. 4, it illustrates the time intervals required for the various steps in processing a telephone call, starting with an off-hook condition. In sequence, these intervals are: a) waiting for a dial tone; b) dialing the digits of the called number; c) a public phone network processing time; and d) a tone recognition processing time. The interval during which a phone call can be interrupted without bothering the called party is the interval prior to the start of the tone recognition processing ($D_{setup}$). Interrupting a call after tone recognition starts is considered a nuisance call since it causes ringing on the called phone and hangs up before the phone is answered. At the same time, it is desirable to delay as long as possible the interruption of a call in the set-up phase since, if an operator becomes available, calls in an advanced process state can result in almost immediately answered calls. The set-up phase is typically on the order of ten seconds. In accordance with the preferred embodiment of the invention, a short interrupt time slot is established during which, but only during which, calls in progress can be interrupted. The interruption slot preferably is on the order of two seconds and extends to, or close to, the beginning of the tone recognition processing interval. Calls on a line that have been processed for an interval that takes them into the interrupt slot can be interrupted. Calls on a line that have been processed for a shorter or longer interval are not interrupted.

Figure 5:
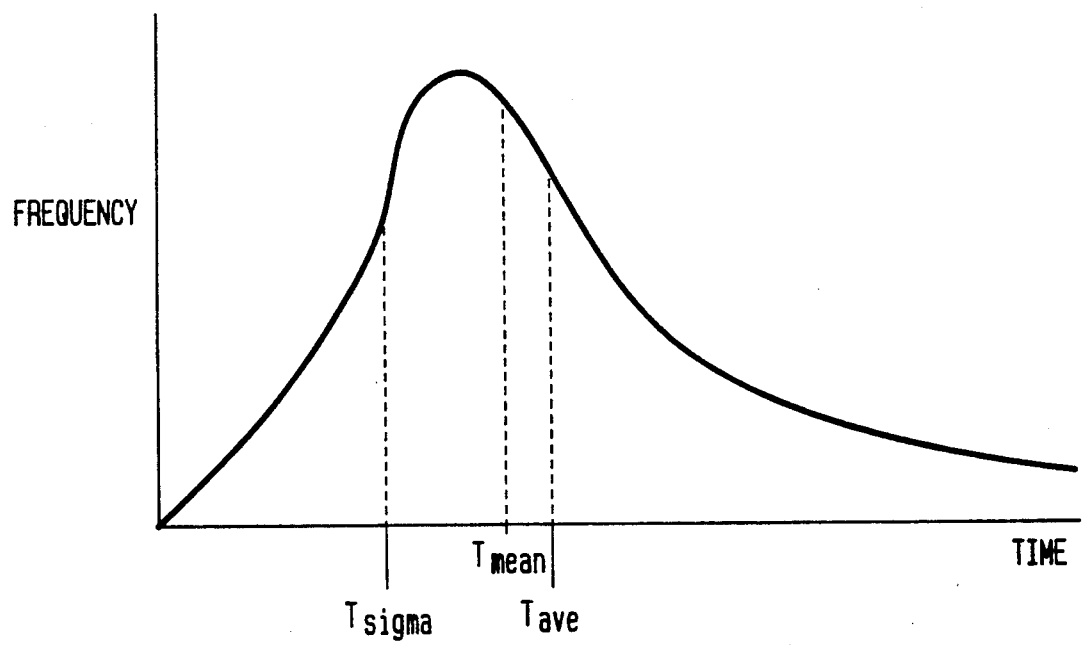
FIG. 5 is a graph showing the frequency of calls plotted as a function of the time of calls, illustrating the mean time and standard deviation of time of calls during a session.

The number of lines to dial is determined preferably by a suitable nonqueuing algorithms such as that disclosed in the Girgis U.S. Pat. No. 4,933,964. As explained more completely in that patent, the frequency at which calls are placed is a function of the duration of the calls. The graph of FIG. 5 is typical of what has been observed in a specific class of call origination management systems; i.e., systems of the nonqueuing type. It will be observed that the graph is distorted to the right from a standard distribution or bell curve. As a result, the mean time, $T_{mean}$, deviates to the right from the average time, $T_{ave}$, by an amount defined as the standard deviation, represented by the Greek letter sigma. What this simply means is that while most calls are short, there are a significant number of calls which are long. Were the curve to be a standard distribution or bell curve, $T_{means}$ and $T_{ave}$ would be the same, and for short connection applications, the standard deviation would be small.

Using the foregoing definitions, the number of call attempts per hour is computed as $$N_1 \times \frac{3600}{T_{setup}}$$

and the number of connections per hours is computed as $$\frac{T_{talk} \times 60}{CON_{time}} \times OP_{num}$$

Now, according to the nonqueuing algorithm implemented in the specific embodiment of the present invention, the connect ratio is computed as follows:

$$CONN_{ratio} = \frac{T_{talk} \times 60}{CON_{time}} \times OP_{num} \times \frac{T_{setup}}{N_1 \times 3600}$$

but, by definition, the connect ratio is the difference of the answer ratio and the maximum ratio of nuisance calls, which is computed as follows:

$$A_{ratio} - NOP_{max} = \frac{T_{talk}}{60} \times \frac{T_{setup}}{CON_{time}} \times \frac{OP_{num}}{N_1}$$

Setting the right-hand side of these two equations equal to one another and solving for $N_1$, the following equation is obtained:

$$N_1 = \frac{T_{talk}}{60} \times \frac{T_{setup}}{CON_{time}} \times \frac{OP_{num}}{A_{ratio} - NOP_{max}}$$

Thus, $N_1$ is directly proportional to the set-up time and the number of operators available, and inversely proportional to the difference between answer ratio and the maximum ratio of nuisance calls allowable. It has been found by experimental tests, however, this relation needs to be modified to adjust for the $NOP_{ratio}$ as indicated by the following equation:

$$N_1 = \frac{T_{setup}}{T_{mean} \pm (C_1 \times T_\sigma)} \times \frac{OP_{exp} + OP_{avail}}{C_2 \times A_{ratio} - NOP_{max}}$$

The foregoing equation assumes $T_{talk} = 60$ minutes and takes into account the distortion of the curve illustrated in FIG. 5.

It will be appreciated that in the implementation of the Girgis algorithm the status of the system is examined periodically (preferably about every two seconds) and a determination of the number of lines to dial is made.

As was previously explained, in accordance with this invention, calls in the interrupt slot may be terminated if the number of available operators falls below a predetermined percentage of the total number of operators on the system. Preferably, the operator availability it determined periodically at the time the number of lines to dial is determined (e.g., every two seconds). For example, in a system with twenty operators and a predetermined percentage of 20%, if there are four or fewer available operators, calls in the interrupt slot may be interrupted. It should be noted that calls continue to be initiated as dictated by the pacing algorithm even if calls are being interrupted in accordance with the interrupt algorithm of this invention.

Figure 6:
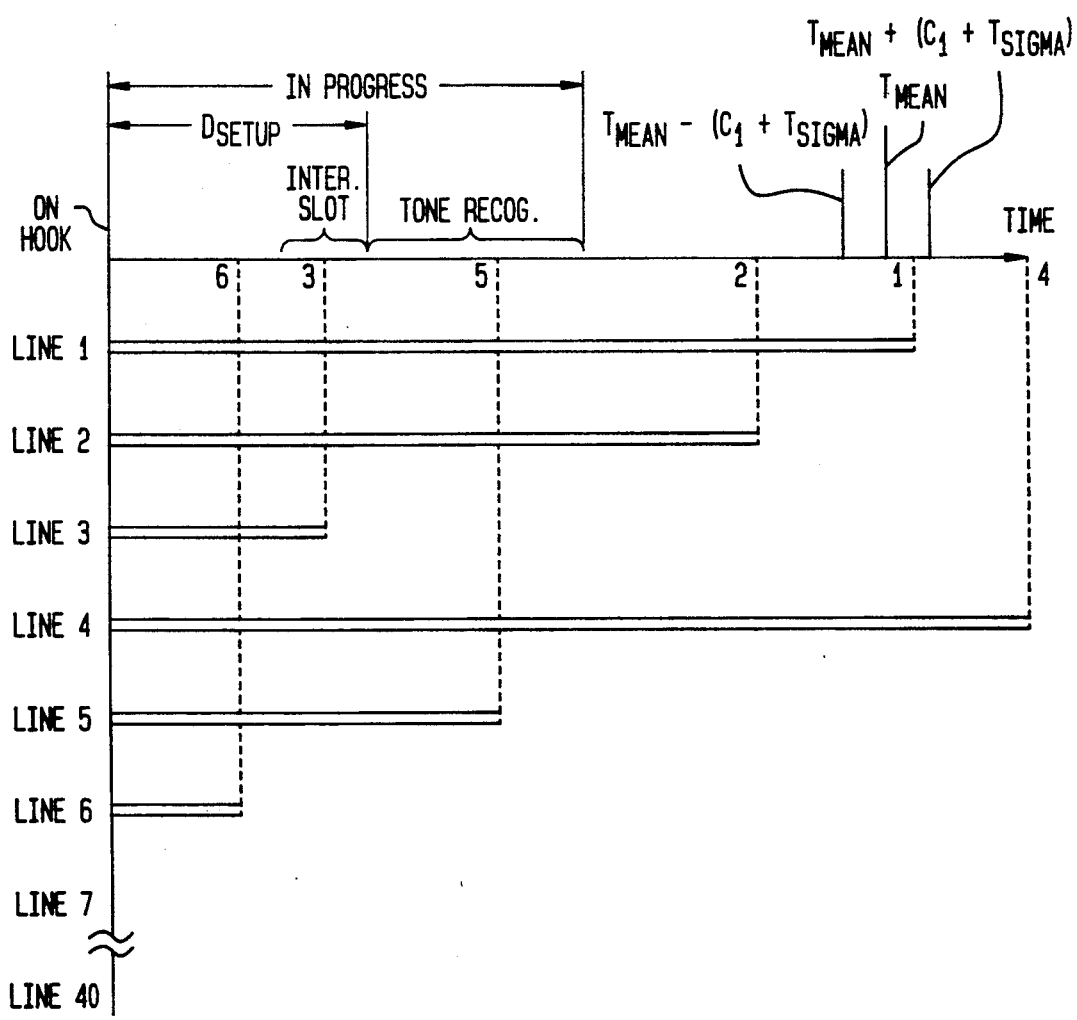
FIG. 6 is an illustration representing the status in time of various lines.

FIG. 6 graphically represents the status, at a point in time, of various lines (e.g., lines 1–40) in a call origination management system. The call on line 4 is connected to an operator and has extended in duration considerably beyond the mean time ($T_{mean}$) of all calls. The operator connected to the call on line 4 is expected to be available in calculating the number of lines to dial. The call on line 1 is connected to an operator and has extended in duration slightly beyond the mean time ($T_{mean}$) of all calls but is still less in duration than a time equal to $T_{mean} + (C_1 \times T_{sigma})$. An operator assigned to this call will be expected to be available or not available, depending on the sense of the term being used $C_1 \times T_{sigma}$ at the time the determination is made. It will be noted that the effect of the sense of the term $C_1 \times T_{sigma}$ (i.e., plus, minus or zero) is to make the system more or less aggressive with respect to the risk of nuisance calls. The call on line 2 is connected to the operator, and the operator assigned to call is considered as unavailable. The call on line 3 is in the interrupt slot, and may be interrupted if the number of available operators is less than the predetermined required number. The calls on lines 5 and 6 are unanswered but would not be interrupted; line 5 is beyond the interrupt slot and line 6 has not yet reached the interrupt slot. Lines 4, 7 and 40 are on-hook and available for dialing.

When the number of actual available operators falls below a predetermined percentage (i.e., twenty percent) of the total number of operators logged onto the system ($SAFETY_{level}$), a number of lines to keep in dialing progress ($N_2$) is determined which will result in answered calls for operators as an operator becomes available and at the same time reduce the chance for nuisance calls to the extent possible. The number of calls to keep is fundamentally equal to the number of available operators, divided by the answer ratio less the maximum allowable ratio of no-operator-available calls (nuisance calls) to call attempts, namely:

$$N_2 = \frac{OP_{avail}}{A_{ratio} - NOP_{max}}$$

Experiments show that the number of calls to keep should contain a factor to allow for adjustment of the ratio of nuisance calls to call attempts. Thus:

$$N_2 = \frac{C_3 * OP_{avail}}{A_{ratio} - NOP_{max}}$$

The number of lines to interrupt is equal to the number of calls in progress (calls dialed but not yet responded to) less the number of calls to keep.

Two sets of coefficients ($C_1$, $C_2$ and $C_3$ listed in FIGS. 7 and 8) were provided to support this improved algorithm. While using the first set of coefficients, the improved algorithm can maximize the operators productivity and minimize the nuisance call percentage. While using the second set of coefficients, the improved algorithm maximizes operator productivity and minimizes not only the nuisance call percentage but also the interrupt call percentage (out of attempts). Since one more constrain is added to the second set of coefficients, the operator productivity delivered by the improved algorithm, using the second set of coefficients, is less than the one that is delivered by the improved algorithm using the first set of coefficients. However, the improved algorithm, using the second set of coefficients, has the ability to reduce the load of call origination management system and public phone switching device by minimizing the interrupt call percentage.

For the first set of coefficients, $C_1$, $C_2$ and $C_3$ are constants which have been empirically determined. More specifically, $C_1$ is a function of $T_{mean}$, $A_{ratio}$, $OP_{num}$ and $NOP_{ratio}$. $C_1$ is not defined as a mathematical function but is, instead, determined empirically and varied depending on how far the ratio of nuisance calls deviates from a set level. In a specific implementation, $C_1$ has three values, depending on how far the number of nuisance calls deviates from the set values for $NOP_{max}$, and works as a pushup/pushdown factor for maintaining the $NOP_{max}$.

Figure 9:
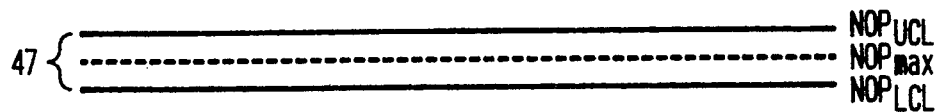
FIG. 9 is a graph illustrating the manner in which the value of a constant $C_1$ is determined as a relation with the maximum value of nuisance calls.

FIG. 9 illustrates the concept. The value $NOP_{max}$ is the center of band 47, defining the ranges of values for the number of nuisance calls. The upper control limit $NOP_{ucl}$ is set as $NOP_{max}$ plus 0.5 percent, while the lower control limit $NOP_{lcl}$ is set as $NOP_{max}$ minus 0.5 percent. It is desired to operate the system within band 47, Which is within $NOP_{ucl}$ and $NOP_{lcl}$. If the number of nuisance calls go above $NOP_{ucl}$, $C_1$ is the first empirically determined value. If the number of nuisance calls falls below $NOP_{lcl}$, $C_1$ is the second empirically determined value. Should the number of nuisance calls fall between $NOP_{ucl}$ and $NOP_{lcl}$, $C_1$ is the third empirically determined value.

For the first set of coefficients, the values of $C_1$, $C_2$ and $C_3$ are listed in tables 78, 79 and 80 of FIG. 7, respectively. Note that $C_1$ may be a function of $T_{mean}$, $A_{ratio}$, $OP_{num}$ and $NOP_{ratio}$, but its values have been determined experimentally by the value of $NOP_{ratio}$. Also, $C_2$ may be a function of $T_{mean}$, $A_{ratio}$, $OP_{num}$ and $T_{mean}$; $C_2$ may become a function of $CON_{denst}$ and $NOP_{ratio}$. Similarly, $C_2$ values have been determined experimentally by the values of $CON_{denst}$ and $NOP_{ratio}$. Finally, $C_3$ may be a function of $OP_{avail}$, $A_{ratio}$ and $NOP_{ratio}$, but its values have been determined experimentally by the values of $OP_{avail}$ and $NOP_{ratio}$.

For the second set of coefficients, the Values of $C_1$, $C_2$ and $C_3$ are listed in FIG. 8. Note that $C_1$ may be a function of $T_{mean}$, $A_{ratio}$, $OP_{num}$ and $NOP_{ratio}$, but its values have been determined experimentally by the value of $NOP_{ratio}$. The values of $C_1$ are listed in table 81. In order to control both $NOP_{ratio}$ and $INT_{ratio}$, the control factors that experimentally determined the values of $C_2$ and $C_3$ have been modified. The values of $C_2$ have been determined experimentally as the product of constants $P_1$ and $P_2$, where $P_1$ value is determined by the number of interrupted calls and $P_2$ value is determined by the number of nuisance calls. The values of $C_3$ have been determined experimentally as the product of constants $P_3$ and $P_4$, where $P_3$ value is determined by the number of interrupted calls and $P_4$ value is determined by the number of nuisance calls. The values of $P_1$, $P_2$, $P_3$ and $P_4$ are listed in tables 82, 83, 84 and 85 of FIG. 8, respectively.

Since the time slot for call interrupt is only a short interval (e.g., a two-second time interval), the dialing process is advantageously smoothed to prevent clustered dialing in a single two-second time slot. Clustered dialing will either cause sudden peak usage of CPU time while interrupting a large number of calls at the same time, or generate nuisance calls more easily, while the clustered dialing trunks pass critical time slots together and result in more answered calls than the number of available operators.

The proper connection rate for a call origination management system to smoothly handle answered calls, is the average number of connects per time slot and can be calculated as:

$$CON_{denst} = \frac{OP_{num} * S_{tslot}}{T_{mean}}$$

In order to prevent clustered dialing trunks, the number of trunks to dial cannot exceed $DIAL_{max}$, which is:

$$DIAL_{max} = \frac{CON_{denst}}{A_{ratio} - NOP_{max}}$$

Otherwise, the system will dial more trunks than it can smoothly serve and cause the clustered dialing situation to occur.

This improved pacing control algorithm uses busy call result returning point to determine the length of $D_{setup}$, and further determine the position of critical time slot for call interrupt. The algorithm samples $T_{busy}$ during the course of campaign operation. Since $B_{recog}$ is known, and is a fixed length of time, one can clearly see from FIG. 4 that $D_{setup}$ can be calculated as:

$$D_{setup} = T_{busy} - B_{recog}$$

Figure 10A:
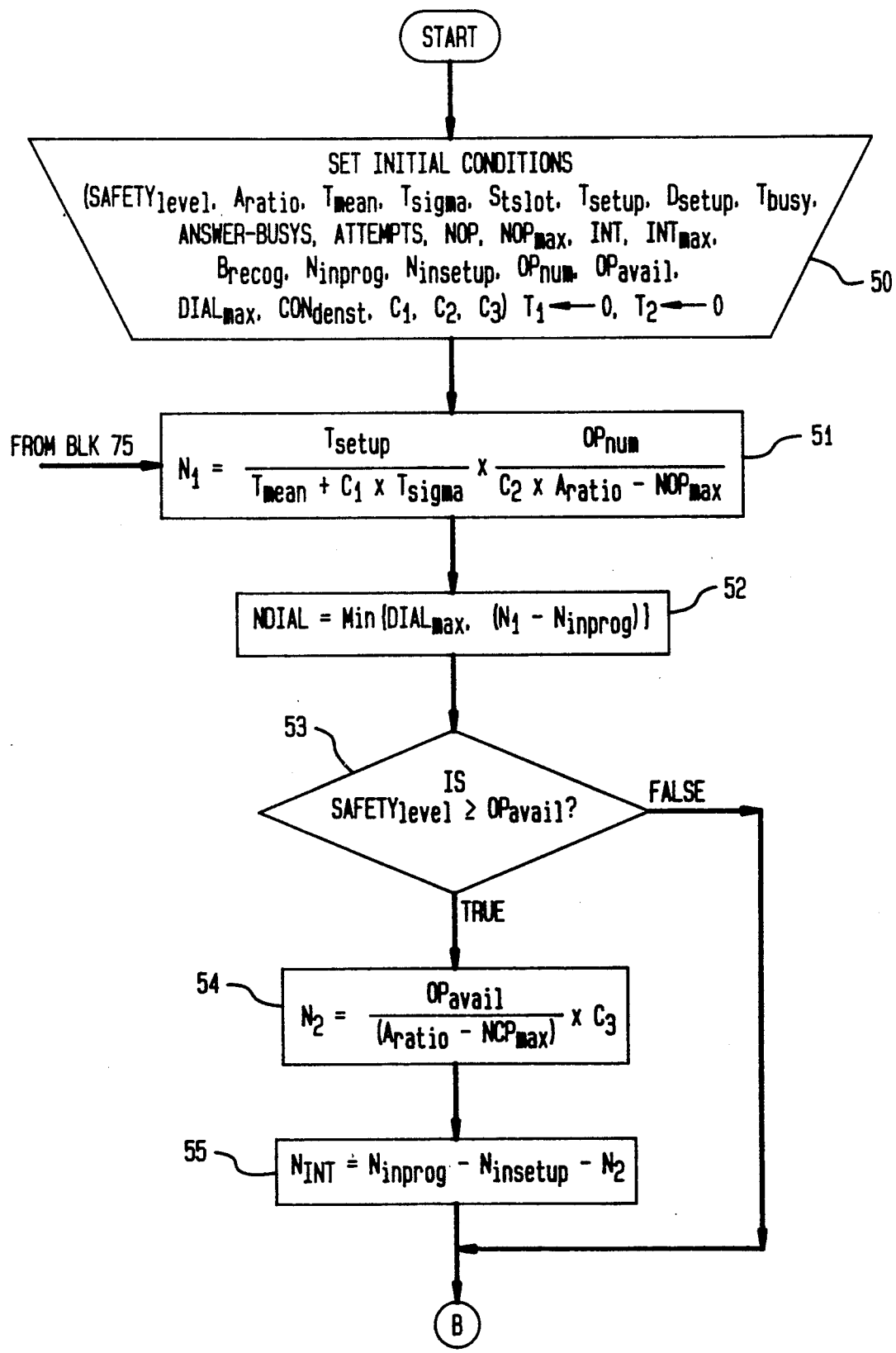
FIGS. 10A-10C are flow charts showing the logic of an implementation of the improved pacing control algorithm according to the invention.
Figure 10B:
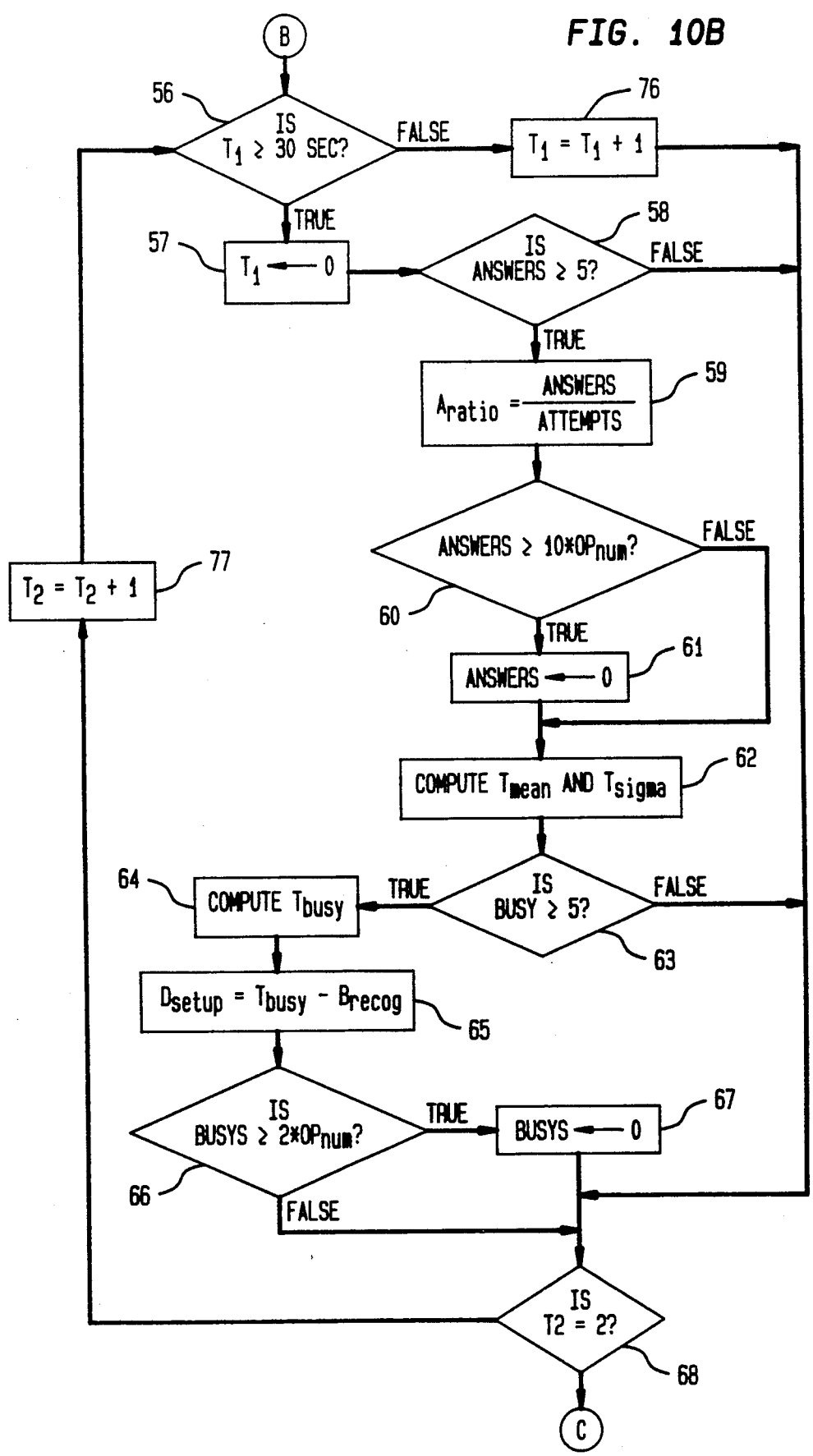
Figure 10C:
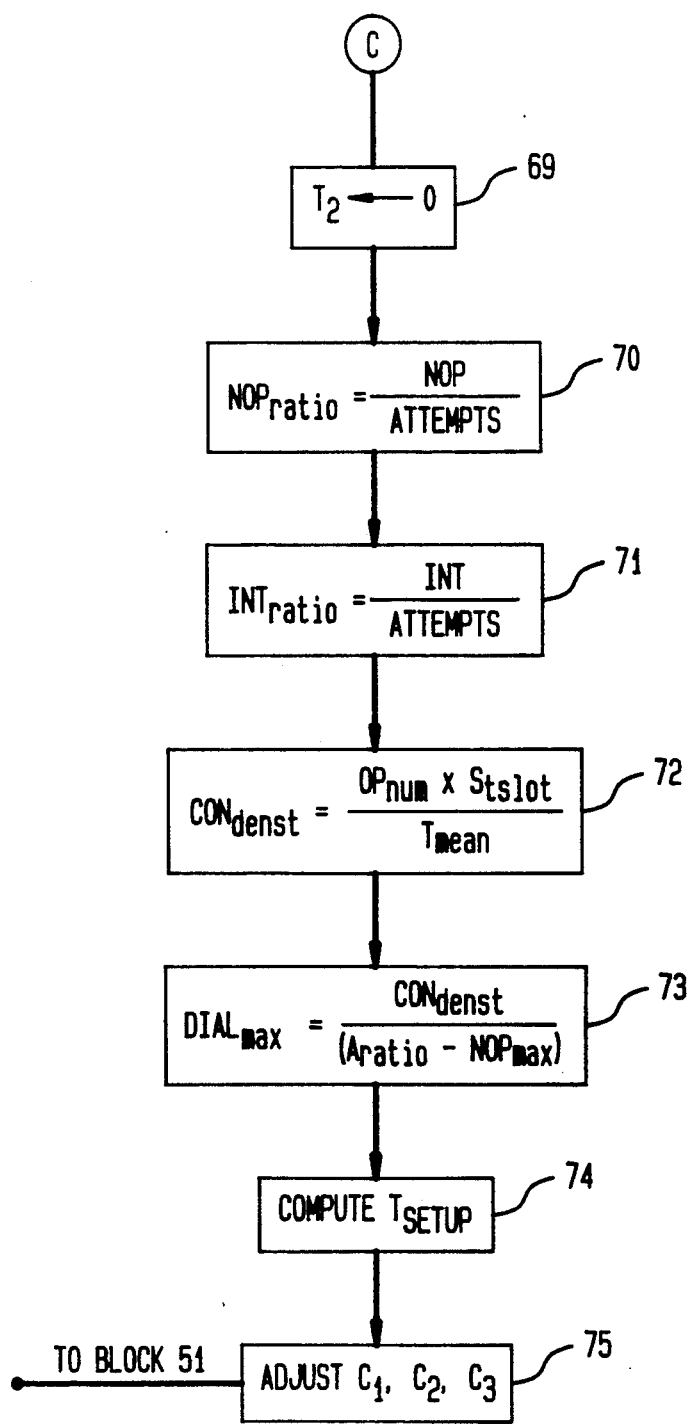

Referring now to FIG. 10 of the drawings, there is shown a flow chart illustrating the logic which implements the algorithm. The process begins at 50 by setting initial conditions. These include the $SAFETY_{level}$, $A_{ratio}$, $T_{mean}$, $T_{sigma}$, $S_{tslot}$, $D_{setup}$, $T_{busy}$, Answers, Busys, Attempts, NOP, $NOP_{max}$, INT, $INT_{max}$, $B_{recog}$, $N_{inprogress}$, $N_{insetup}$, $OP_{num}$, $OP_{avail}$, $DIAL_{max}$, $CON_{densr}$, $C_1$, $C_2$, and $C_3$. Most of the values are the default values which are set at the beginning of the campaign, but the number of operators is specified by the supervisor. The actual values of the default values are good initial "guesses" based on empirically determined data from other, similar campaigns.

The number of calls is computed in function block 51. In the initial phase, this computation is based on the initial condition values, including the default values. The number of calls to dial is then determined in function block 52 as the smaller value of either $DIAL_{max}$ or the number computed in function block 51, less the number of calls currently in progress. In decision block 53, a test is made to determine if the number of available operators is less than or equal to $SAFETY_{level}$. If the number of available operators is less than or equal to $SAFETY_{level}$, the number of calls to keep is computed in function block 54. The number of calls to interrupt is then determined in function block 55, as the number of calls currently in progress, less the number of calls currently in set-up phase and the number of calls to keep. In decision block 56, a test is made to determine if 30 seconds have elapsed. Thirty seconds is the duration of a phase. If 30 seconds have elapsed, the phase clock is reset to 0 in function block 57, and a further test is made in decision block 58 to determine if the answers for the phase was greater than, or equal to five, an empirically determined value. If so, the answer ratio is computed in function block 59, as the number of answers divided by the number of attempts. Then, in decision block 60, a test is made to determine if the number of answers for the phase is greater than, or equal to, ten times the number of operators logged on. Note again, that ten is an empirically determined number. If so, the answers per phase is reset to 0 in function block 61, and in function block 62, the actual values for $T_{mean}$ and $T_{sigma}$ are computed based on the data accumulated for the preceding phase. In decision block 63, a further test is made to determine if the busys for the phase was greater than, or equal to five, an empirically determined value. If so, the actual value for $T_{busy}$ is computed in function block 64, and the value for $D_{setup}$ is determined as $T_{busy} - B_{recog}$ in function block 65. Then, in decision block 66, a test is made to determine if the number of busys for the phase is greater than, or equal to, two times the number of operators logged on. Note again, that two is an empirically determined number. If so, the busys per phase is reset to 0 in function block 67. Then, in decision block 68, a test is made to determine if a 2-second clock has expired. The purpose of this 2-second clock is to minimize the load on the CPU. If so, the 2-second clock is reset in function block 69 and then, in function block 70, the nuisance call ratio is computed as the ratio of nuisance calls to the number of attempts. The interrupted call ratio is computed as the ratio of interrupted calls to the number of attempts in function block 71. Then, the values of $CON_{densr}$ and $DIAL_{max}$ are computed in function block 72 and 73, respectively. Now the set-up time is computed in function block 74, and in function block 75, the constants $C_1$, $C_2$ and $C_3$ are adjusted. The process then returns to function block 51, where based on the adjusted values for constants $C_1$ and $C_2$, the number of calls to dial are again computed.

Going through the flow diagram again, if the test in decision block 53 is negative, the process jumps to decision block 56 and no calls will be interrupted. If the test in decision block 56 is negative, indicating that a phase has not yet timed out, the phase clock is incremented in function block 76 before the process jump to decision block 68. If the test in decision block 58 is negative, the process jumps directly to decision block 68. Next, in decision block 60, if the test is negative, the $T_{mean}$ and $T_{sigma}$ are computed. If the test in decision block 63 is negative, the process jumps directly to decision block 68. If the test in decision block 66 is negative, the process jumps to decision block 68. Finally, if the test in decision block 68 is negative, the 2-second clock is incremented in function block 77 before the process loops back to decision block 56 to test the phase clock.

FIGS. 11 through 16 illustrate the performance of this improved pacing control algorithm, and the characteristics of call origination management systems with conditional interrupts.

FIG. 11 is a family of graphs showing talk time as a function of the number of operator workstations per campaign, for various values of connect time with best-suited $LO_{ratio}$ at $A_{ratio}$ equal to 25 percent and $NOP_{max}$ equal to 2 percent. These graphs show that as the number of operators per campaign increases, the talk time increases. Since $CON_{densr}$ is a function of $OP_{num}$, one knows that $CON_{densr}$ has the positive influence on operator talk time. Eight is the minimum number of operators per campaign for this improved pacing algorithm to successfully control the $NOP_{ratio}$ under 2 percent. From these graphs, it is also apparent that the higher the conversation time, the less number of lines are required to maintain a certain amount of talk time. Furthermore, while the connect time ($CON_{time}$) decreases, the talk time decreases. FIG. 11, together with FIGS. 12 and 13, also show that as the answer ratio increases, the talk time increases and less number of lines are needed.

Figure 13:
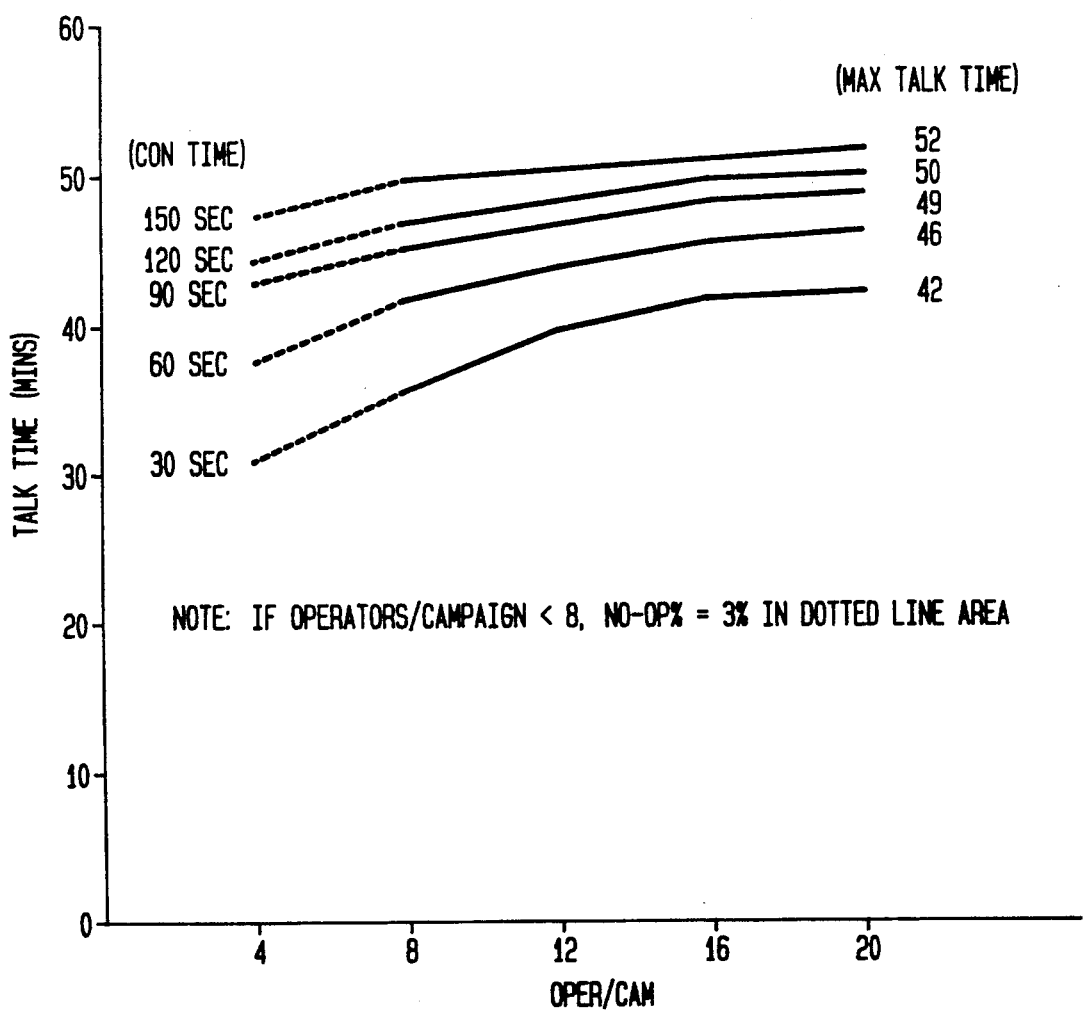
FIG. 13 is a family of graphs similar to FIG. 11 showing talk time as a function of the number of operator workstations per campaign for various values of connect time with best-suited line to operator workstation ratio, at an answer ratio equal to 45 percent and maximum nuisance call ratio equal to 2 percent.
Figure 14:
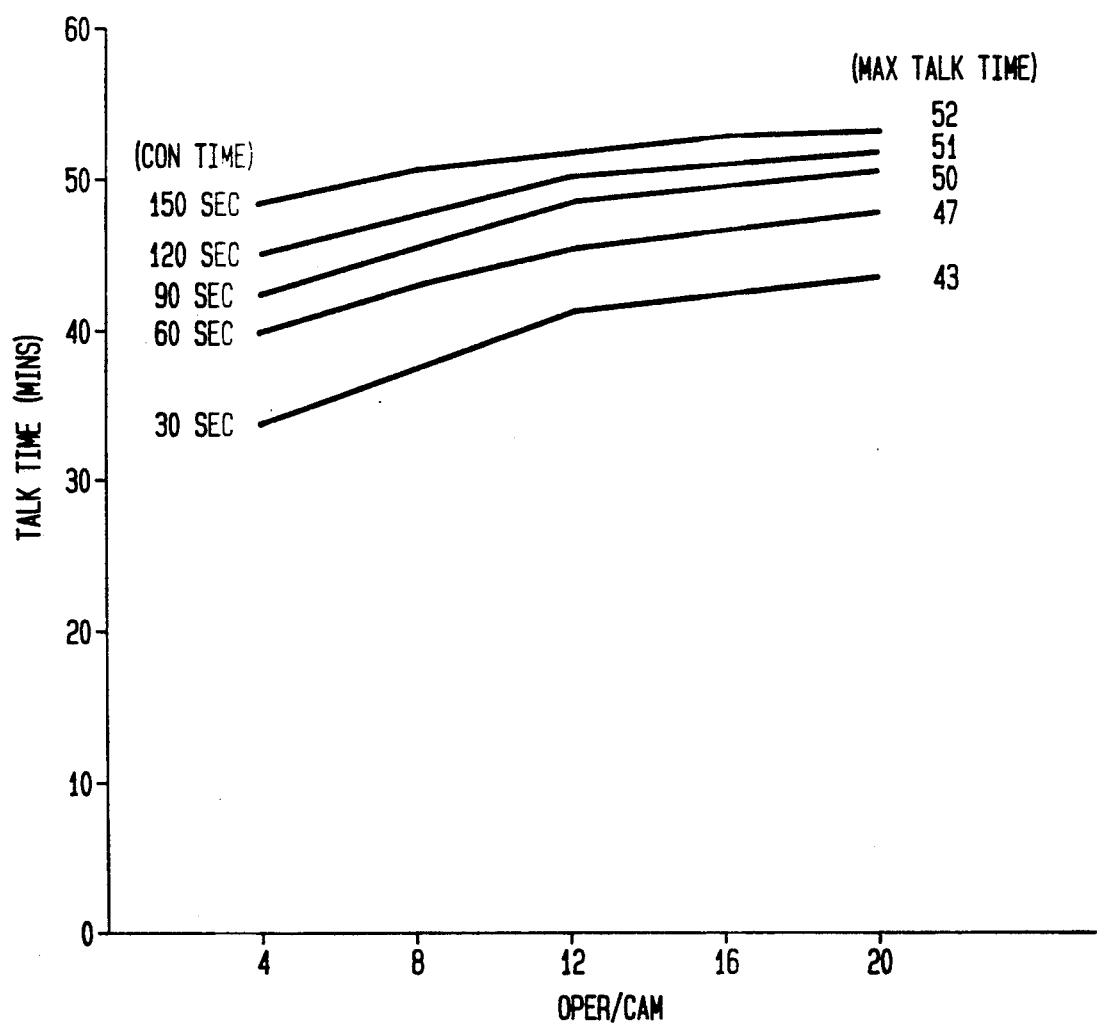
FIG. 14 is a family of graphs similar to FIG. 11 showing talk time as a function of the number of operator workstations per campaign for various values of connect time with best-suited line to operator workstation ratio, at an answer ratio equal to 25 percent and maximum nuisance call ratio equal to 5 percent.
Figure 15:
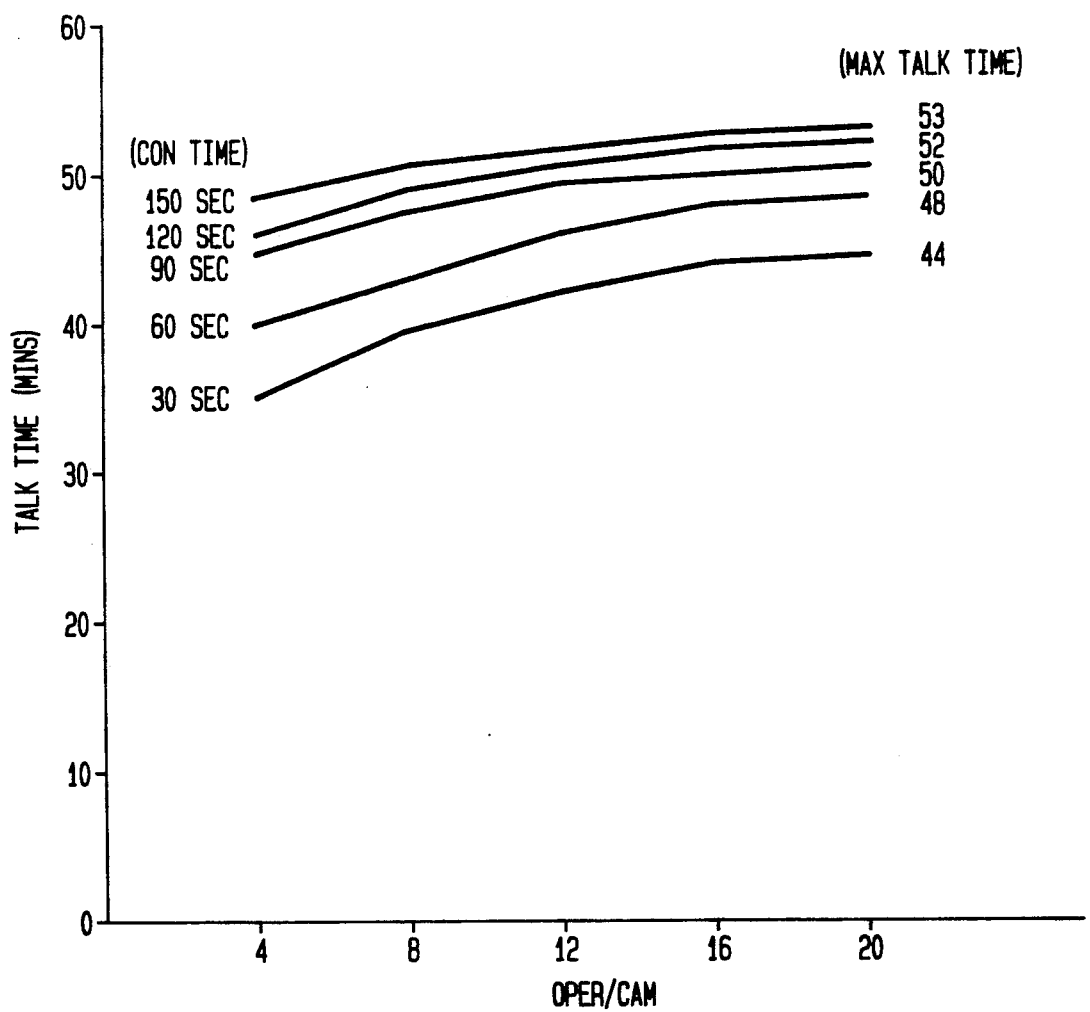
FIG. 15 is a family of graphs similar to FIG. 11 showing talk time as a function of the number of operator workstations per campaign for various values of connect time with best-suited line to operator workstation ratio, at an answer ratio equal to 35 percent and maximum nuisance call ratio equal to 5 percent.

Despite setting $NOP_{max}$ at 5 percent, FIGS. 14, 15 and 16 are a similar set of figures as FIGS. 11, 12 and 13. All the characteristics illustrated by FIGS. 11, 12 and 13 also appear in FIGS. 14, 15 and 16. While comparing these two sets of figures, one can tell that higher talk time can be achieved by setting $NOP_{max}$ to a higher percentage. Furthermore, this improved algorithm is more robust to the number of operators per campaign when operating at higher $NOP_{max}$.

FIGS. 17 and 18 show the improved efficiency and lower number of nuisance calls of this improved pacing control algorithm. FIG. 17 illustrates that when 85 percent of the connected calls result in long conversation, say 155 seconds, this improved pacing control algorithm produced 7 more minutes (50 vs. 43) talk time over the prior pacing algorithm, when $NOP_{max}$ is set to 2 percent. On the other hand, when setting talk time at the same level (50 minutes), this improved algorithm reduced nuisance call percentage from 7.5 percent down to 1.6 percent. FIG. 18 shows the similar effects with 60 percent of the connected calls resulting in short conversation, say 70 seconds.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of pacing calls in a call origination management system that has a number of operators to which answered calls are connected, comprising the steps of:
   determining a number of lines to dial;
   dialing calls based on said number of lines to dial established in said determining step;
   establishing an interrupt time slot for a dialed call that extends in duration from a time after a call is dialed to a time prior to a time when said call would be expected to result in a ring signal on a dialed line; and
   terminating a call in said interrupt time slot conditionally in order to reduce a ratio of nuisance calls to call attempts.

2. A method of pacing calls as in claim 1, wherein said time prior to a time when said call would be expected to result in a ring signal is determined by a further step that includes sampling the time between dialing a call and a busy signal return to the system.

3. A method of pacing calls as in claim 2, including a further step of limiting said dialing calls in a period equal to said interrupt slot to a number that is a function of the average number of answered calls per interrupt time slot, and a ratio of answered calls to calls dialed less a ratio of maximum ratio of no-operator calls to call attempts.

4. A method of pacing calls as in claim 1, including a further step of limiting said dialing calls in a period equal to said interrupt slot to a number that is a function of the averaged number of answered calls per interrupt time slot, and a ratio of answered calls to calls dialed less a ratio of maximum ratio of no-operator calls to call attempts.

5. A method of pacing calls in a call origination management system that has a number of operators to which answered calls are connected, comprising the steps of:
   determining a number of lines to dial as a function of parameters that include a mean time of all calls multiplied by a first constant, and a second constant times a ratio of answered calls to call attempts;
   dialing a number of calls according to said determining step;
   establishing an interrupt time slot for a dialed call that extends in duration from a time substantially after a call is dialed to a time prior to a time when said call would be expected to result in a ring signal on a dialed line;
   determining a ratio of operators available to be connected to an answered call to said number of operators and if said ratio of operators available to said number of operators falls to or below a predetermined ratio;
   a) determining a number of calls to interrupt as a function of a number of available operators, an answer ratio, and a third constant; and
   b) terminating calls in said interrupt time slot.

6. A method of pacing calls as in claim 5, further including a step of selecting between a first set of said first, second and third constants, and a second set of said first, second and third constants.

7. A method of pacing calls as in claim 5, wherein said predetermined ratio is twenty percent.

8. A method of pacing calls as in claim 5, wherein said time prior to a time when said call would be expected to result in a ring signal is determined by a further step that includes sampling the time between dialing a call and a busy signal return to the system.

9. A method of pacing calls as in claim 8, further including a step of selecting between a first set of said first, second and third constants, and a second set of said first, second and third constants.

10. A method of pacing calls as in claim 8, including a further step of limiting said dialing calls in a period equal to said interrupt slot to a number that is a function of the average number of answered calls per interrupt time slot, and a ratio of answered calls to calls dialed less a ratio of maximum ratio of no-operator calls to call attempts.

11. A method of pacing calls as in claim 10, further including a step of selecting between a first set of said first, second and third constants, and a second set of said first, second and third constants.

12. A method of pacing calls as in claim 5, including a further step of limiting said dialing calls in a period equal to said interrupt slot to a number that is a function of the average number of answered calls per interrupt time slot, and a ratio of answered calls to calls dialed less a ratio of maximum ratio of no-operator calls to call attempts.

13. A method of pacing calls as in claim 12, further including a step of selecting between a first set of said first, second and third constants, and a second set of said first, second and third constants.

14. A method of pacing calls as in claim 12, wherein said predetermined ratio is twenty percent.

* * * * *